United States Patent
Varma et al.

(10) Patent No.: US 12,499,069 B2
(45) Date of Patent: Dec. 16, 2025

(54) DYNAMIC PERIPHERAL COMPONENT INTERCONNECT-EXPRESS PERFORMANCE MANAGEMENT

(71) Applicant: DELL PRODUCTS L.P., Round Rock, TX (US)

(72) Inventors: Suraj M Varma, Portland, OR (US); Farzad Khosrowpour, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 21 days.

(21) Appl. No.: 18/605,493

(22) Filed: Mar. 14, 2024

(65) Prior Publication Data

US 2025/0291752 A1  Sep. 18, 2025

(51) Int. Cl.
*G06F 13/28*  (2006.01)

(52) U.S. Cl.
CPC .................................. *G06F 13/28* (2013.01)

(58) Field of Classification Search
None
See application file for complete search history.

(56) References Cited

U.S. PATENT DOCUMENTS

| | | | | |
|---|---|---|---|---|
| 6,078,971 | A * | 6/2000 | Tsutsumi | G06F 13/28 710/24 |
| 10,592,285 | B2 | 3/2020 | Beckett et al. | |
| 11,341,076 | B2 | 5/2022 | Bolen et al. | |
| 11,379,373 | B2 * | 7/2022 | Ray | G06F 13/4282 |
| 2008/0091857 | A1 * | 4/2008 | McDaniel | H04L 63/123 710/72 |
| 2008/0104378 | A1 * | 5/2008 | Huang | G06F 9/30101 713/1 |
| 2013/0086336 | A1 * | 4/2013 | Canepa | G06F 3/067 711/154 |
| 2017/0093521 | A1 | 3/2017 | Wang et al. | |
| 2018/0335956 | A1 * | 11/2018 | Iyer | G06F 3/067 |
| 2020/0226078 | A1 * | 7/2020 | Tanaka | G06F 12/0806 |
| 2020/0341924 | A1 | 10/2020 | Lambert et al. | |
| 2020/0394076 | A1 | 12/2020 | Chan et al. | |
| 2023/0229751 | A1 | 7/2023 | Reineke et al. | |

* cited by examiner

*Primary Examiner* — Michael Sun
(74) *Attorney, Agent, or Firm* — Larson Newman, LLP

(57) ABSTRACT

An information handling system detects transmission of input/output data, and enables a data direct input/output capability associated with a PCIe port based on the PCIe performance policy. The system performs a direct memory access transfer of the input/output data to a cache based on the PCIe performance policy, wherein the input/output data is transferred through the PCIe port with the data direct input/output capability.

20 Claims, 5 Drawing Sheets

| Application Type 505 | Usage 510 | Data Type 515 | PCIe Performance Setting 520 | DDIO Action 525 |
|---|---|---|---|---|
| Digital Audio Workstation | Process an audio recording from an external device | Isochronous | Set one or more PCIe controller ports to intermediate performance setting | Turn on memory-side caching |
| Digital Audio Workstation | Render or perform a post processing of recorded audio from and to a storage device | Asynchronous/ Synchronous | Increase performance of one or more non-volatile memory express (NVMe) controller ports | Transfer data via DMA to a LLC cache |
| Digital Audio Workstation | Playback an audio recording on a USB-C speaker | Isochronous | Set one or more PCIe controller ports to intermediate performance setting | Turn on memory-side caching |
| File Hosting Service | Transfer a large file set from a cloud service to a storage device | Asynchronous/ Synchronous | Increase performance of one or more network and NVMe controller ports | No action |
| File Archiver | Unzip a large file from a USB storage device and store the large file set in an NVMe storage device | Isochronous and Asynchronous | Increase performance of extensible host controller interface (XHCI) controller port and NVMe controller ports | Turn on memory-side caching |
| File Archiver | Unzip a large file from a location in an SSD and store in another location in the SSD | Asynchronous/ Synchronous | Increase bandwidth of one or more NVMe controller ports | Transfer data via DMA to a LLC cache |
| System Optimizer | Set a USTT mode to a ultra performance mode | Not Applicable | Set PCIe controller ports to maximum performance | Turn off DDIO capability and memory-side caching |
| System Optimizer | Set a USTT mode to a quiet mode | Not Applicable | Set PCIe controller ports to lowest performance | Tansfer data via DMA to a LLC cache |
| Operating System | Set an operating system power scheme to a performance scheme | Not Applicable | Set PCIe controller ports to maximum performance | Transfer data via DMA to a LLC cache |
| Operating System | Set an operating system power scheme to a power efficiency scheme | Not Applicable | Set PCIe controller ports to lowest performance | Turn off DDIO capability and memory-side caching |

*FIG. 5*

DYNAMIC PERIPHERAL COMPONENT INTERCONNECT-EXPRESS PERFORMANCE MANAGEMENT

FIELD OF THE DISCLOSURE

The present disclosure generally relates to information handling systems, and more particularly relates to dynamic peripheral component interconnect-express performance management.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system detects transmission of input/output data, and enables a data direct input/output capability associated with a PCIe port based on the PCIe performance policy. The system performs a direct memory access transfer of the input/output data to a cache based on the PCIe performance policy, wherein the input/output data is transferred through the PCIe port with the data direct input/output capability.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 5 is a table for a PCIe performance management policy, according to an embodiment of the present disclosure.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
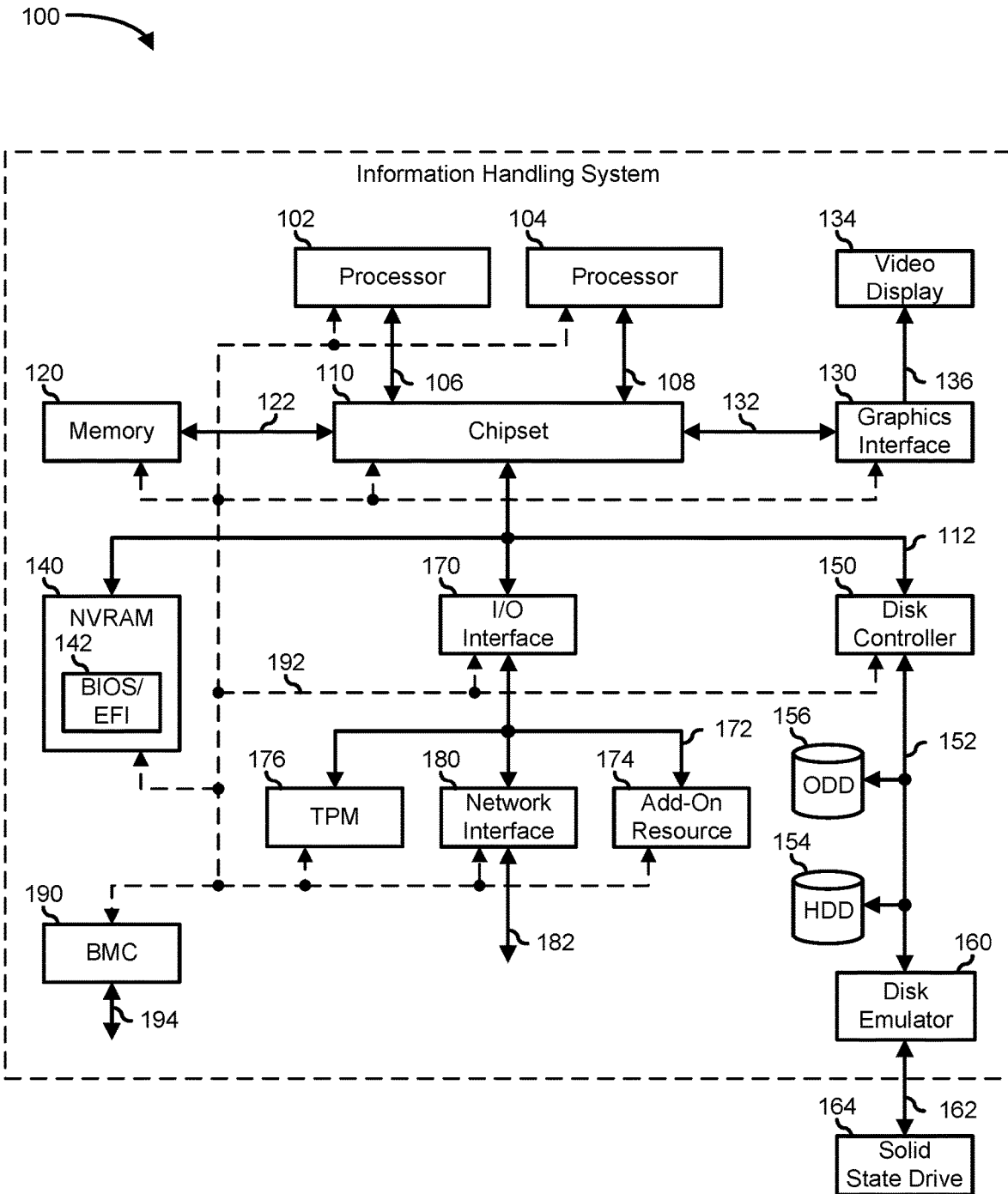
FIG. 1 is a block diagram of an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NVRAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (x4) PCIe adapter, an eight-lane (x8) PCIe adapter, a 16-lane (x16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NVRAM 140, disk controller 150, and I/O interface 170 are connected to chipset 110 via an I/O channel 112. An example of I/O channel 112 includes one or more point-to-point PCIe links between chipset 110 and each of NVRAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. NVRAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board, or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172 and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device, a BMC may be referred to as an embedded controller (EC). A BMC included in a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, and transfers the firmware updates to the NVRAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor defined interfaces (such as a Dell EMC Remote Access Controller Administrator (RACADM) utility, a Dell EMC OpenManage Enterprise, a Dell EMC OpenManage Server Administrator (OMSA) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC, or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NVRAM associated with the BMC. Information stored in the RAM may be lost after power-down of the power plane for BMC 190, while information stored in the NVRAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purposes of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

An information handling system may utilize various protocols and standards for communicating with internal components of the information handling system and with the external components and systems that are supported by the information handling system. PCIe is a high-bandwidth I/O interface or data bus that is commonly used by information handling systems as a communication mechanism. Because of its high-speed data transmission capabilities, PCIe is used as a communication interface for many types of components including graphics cards, streaming multimedia devices, network cards, USB cards, and certain types of storage devices. PCIe may also be used for establishing direct high-speed communication between information handling systems that are in close proximity to each other and are configured as a computing cluster, such as an enterprise data center implementation. The components of the information handling system that utilize PCIe may include integrated components of the information handling system as well as removable components that are coupled to the information handling system via the use of expansion cards.

Overall bandwidth and power consumption for transmitting data via the PCIe interface to various subsystems systems like storage, network, discrete graphics, and lower speed IO technologies such as a USB may be based on various factors. These factors may include PCIe speed, maximum payload size, maximum read request, and read completion boundary. Another factor may also include a target of a DMA transfer, such as whether the target is a memory or a cache. Generally there is no runtime mechanism to dynamically change a PCIe setting to adjust a PCIe performance without a reboot that includes a retraining of PCIe lanes.

Typically, incoming I/O data is stored first in a main memory of a processor. The processor reads the data from the main memory into a cache to operate on the data. Conversely, outgoing I/O data is generally transferred from the cache to the main memory. Thus the processor generally performs read and/or write operations from the main memory, which increases latency, degrades performance, and increases power consumption. Accordingly, there is an opportunity for improved latency and system performance along with power savings. To address these and other issues, the present disclosure provides a system and method for dynamic PCIe performance management, wherein I/O traffic may be directed to a cache first when reading or writing instead of the main memory.

Figure 2:
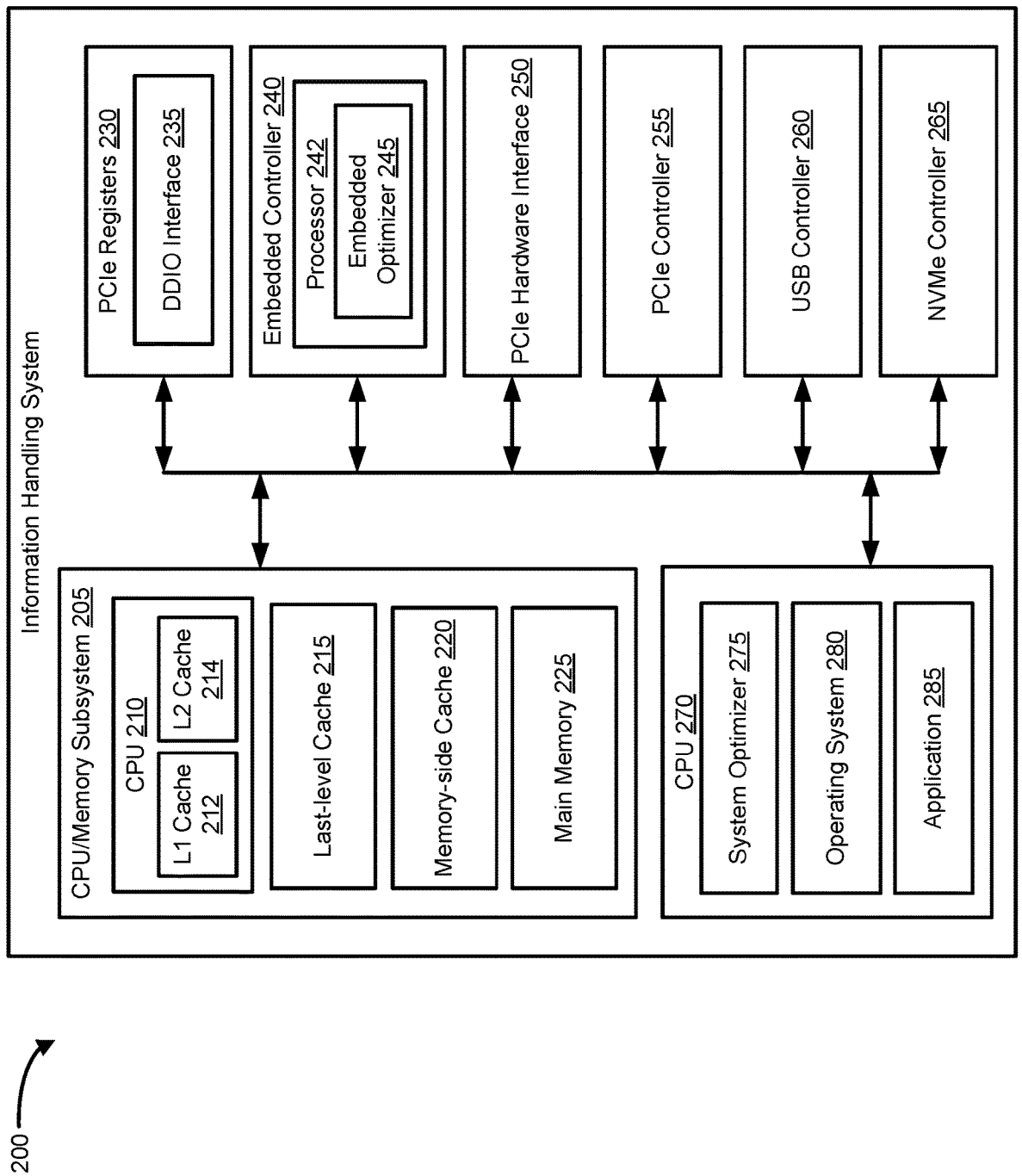
FIGS. 2-3 are block diagrams of a portion of an information handling system according to an embodiment of the present disclosure.

FIG. 2 shows a portion of an information handling system 200, according to an embodiment of the present disclosure. Information handling system 200 includes a CPU/memory subsystem 205, a PCIe registers 230, an embedded controller 240, a PCIe hardware interface 250, a PCIe controller 255, a USB controller 260, an NVMe controller 265, and a CPU 270. CPU/memory subsystem 205 includes a CPU 210, a last-level cache 215, a memory-side cache 220, and a main memory 225. CPU 210 includes an L1 cache 212 and an L2 cache 214. CPU/memory subsystem 205 can include more than one processor. Embedded controller 240 includes a processor 242 which further includes an embedded optimizer 245. CPU 270 includes a system optimizer 275, an operating system 280, and an application 285. Information handling system 200 may include additional components, such as one or more network ports for communicating with external devices as well as various I/O devices, such as a keyboard, a mouse, a touchscreen, and/or a video display. Information handling system 200 may also include one or more buses operable to transmit communications between the various hardware components. However, certain connections between the components may be omitted for descriptive clarity.

Typically, on client platforms, such as desktop computing systems, laptop/notebook computing systems, or other client computing systems known in the art, direct memory access (DMA) controllers are generally not configured to direct data traffic from various controllers to a last level cache (LLC) instead of a main memory. These controllers include non-volatile memory express (NVMe) controllers, network controllers, infrastructure processing unit (IPU) controllers, USB controllers, etc. For example, isochronous data transfers from a USB controller utilize the main memory instead of the LLC, which impacts the system's performance.

However, information handling system 200 may be configured to direct data traffic from various controllers to an LLC or a memory-side cache instead of the main memory. In addition, information handling system 200 may also be configured with hardware support for dynamic PCIe performance settings that can be dynamically controlled or programmed via chipset registers through a PCIe hardware interface without operating system reboot or PCIe retraining on reset. This allows a current workload condition to be varied associated with an input/output data, optimizing performance of information handling system 200 by improving latency, system I/O bandwidth, and power savings. A chipset register may be associated with one or more PCIe configuration settings.

CPU 210 and CPU 270 may be similar to processors 102 and 104 of FIG. 1 and can be any of various types, including an x86 processor, an x64 processor, etc. The operations described herein as being performed by system optimizer 275, operating system 280, and application 285 may be performed or executed by CPU 210 or CPU 270. Similarly, CPU 210 may perform any suitable operations for other applications. CPU 210 may include multiple data caches, such as L1 cache 212 and L2 cache 214 for processing. L1 cache 212 may be local to a particular processor or processor core. L2 cache 214 may be shared between multiple processors or processor cores within CPU/memory subsystem 205. Last-level cache 215 may be shared by one or more processors included in CPU/memory subsystem 205. Last-level cache 215 may be configured as a last chance for memory access from CPU 210 to avoid the costly latency of going to main memory 225.

Memory-side cache 220 may be a physical memory cache for isochronous data. Main memory 225, which is similar to memory 120 of FIG. 1, may be configured as a primary storage area of information handling system 200. Main memory 225 may also store an operating system, as well as other software for operation of information handling system 200, such as system optimizer 275 and application 285. PCIe registers 230 may be a set of registers that provide a way for the system to identify and control PCIe devices. For example, PCIe registers 230 may be used to control the status of a PCIe port. In particular, PCIe registers 230 may be used to define a memory allocation or I/O space for a PCIe component by enabling or disabling a data direct I/O (DDIO) capability of the PCIe port. The DDIO capability may be managed or controlled via DDIO interface 235. DDIO interface 235 may be utilized for improved system performance during a DMA transfer by transferring asynchronous and/or synchronous data into last-level cache 215 of CPU 210, instead of main memory 225. While memory-side cache 220 may be a hardware device that is configured for DMA transfer of isochronous data instead of main memory 225.

In particular, DDIO interface 235 may be configured to enable or disable the DDIO capability of a PCIe root port based on a source of data and/or data type via PCIe controller 255. The DDIO capability of a certain PCIe root port may be configured to direct certain I/O data to either last-level cache 215, memory-side cache 220, or main memory 225 based at least on the source of the data or the data type. For example, for asynchronous and synchronous data, the DDIO capability of a first root port may be enabled to allow transmission of the asynchronous and synchronous data to last-level cache 215 instead of main memory 225. In another example, for isochronous data traffic, the DDIO capability of a second root port may be turned on to allow transmission of the isochronous data to memory-side cache 220 instead of main memory 225.

Embedded controller 240 may include a ROM and a random-access memory (RAM), wherein embedded controller 240 may be configured to read an embedded controller firmware, such as embedded optimizer 245. In addition, embedded controller 240 may include processor 242 to process instructions associated with embedded optimizer 245. Embedded optimizer 245 may be configured to change one or more PCIe performance parameters or settings associated with PCIe hardware interface 250 based on one or more criteria of a set of criteria. The criteria may include workload type, user priority, operating system power scheme, and USTT settings, among others. Embedded optimizer 245 may also be configured to control a global or an individual DDIO capability via DDIO interface 235 based on the set of criteria.

PCIe hardware interface 250 may be configured for dynamic PCIe performance control. PCIe hardware interface 250 may adjust one or more PCIe programmable performance settings to optimize PCIe performance. The PCIe programmable performance settings include maximum payload size, maximum read request size, read completion boundary size, PCIe speed, and PCIe lane width, among others. For example, the PCIe speed may be adjusted based on a generation setting of the PCIe interface. In particular, a maximum speed of a first-generation PCIe interface may be 250 megabytes per second while a maximum speed of a second-generation PCIe interface may be 500 megabytes per second.

PCIe controller 255 may be configured to manage contents of multiple data caches, such as L1 cache 212, L2 cache 214, last-level cache 215, and memory-side cache 220 as directed by embedded optimizer 245 and/or system optimizer 275. PCIe controller 255 may include one or more PCIe ports, such as a PCIe root port, with a configurable setting or knob that can be modified or adjusted via PCIe hardware interface 250. For example, the DDIO capability of a PCIe root port may be enabled or disabled via PCIe hardware interface 250 based on the data type of I/O data detected at NVMe controller 265.

System optimizer 275 may be configured to manage and control the performance of one or more applications or components of information handling system 200 with embedded optimizer 245. In particular, system optimizer 275 may be configured to determine whether to enable or disable a target DDIO capability of a particular PCIe port. This may be performed by enabling or disabling the target DDIO capability via DDIO interface 235 of PCIe register 230. System optimizer 275 may also be configured to adjust or modify one or more PCIe performance settings based on a set of criteria, such as according to an application or workload requirement, application context, data type, application type, workload type, workload usage, etc.

System optimizer 275 may also be configured to transmit a power management trigger to embedded optimizer 245 based on a desired operating system power scheme or a BIOS-based user-selectable thermal table (USTT) mode. For example, system optimizer 275 may be configured to determine a USTT mode based on an application context and a current operating system power scheme. The USTT may include a finite number of different pre-defined user modes expressed as different thermal tables that each define a different fan speed policy as a function of a sensed temperature range. Each of these USTT modes includes a different set of specified fan speed values for the individual cooling fans of information handling system 200 as a function of the sensed system temperature range. System optimizer 275 may determine an optimal USTT mode and transmit a control setting for the optimal USTT mode to embedded optimizer 245.

In a particular example, during audio recording via external recorders through a USB-C device, embedded optimizer 245 may turn off PCIe lanes for ports that are not active via DDIO interface 235. This may be performed to provide additional bandwidth for the USB transfer of audio recording data. In addition to the additional bandwidth, turning off the inactive ports may also reduce data transfer latency with minimal audio artifacts. During the rendering phase of the audio recording data, embedded optimizer 245 may directly access the audio recording data stored in an NVMe storage device and then enable a DDIO associated with a PCIe root port to transfer the audio recording data to memory-side cache 220 for processing instead of main memory 225. Doing this may reduce the read and write data transfer from and/or to main memory 225 reducing latency, optimizing performance, and reducing power consumption.

In another particular example, when a new information handling system is attached to a corporate network, a large amount of network data transfer or network file transfer may occur to fetch data from the information handling system into the corporate network. In addition, the data may also be indexed and scanned. By enabling a DDIO capability for a PCIe port in the new information handling system, the network data can be directly transferred to an LLC instead of its main memory for indexing and applying security measures which reduces I/O latency. The network data in the LLC can then be directly transferred from the LLC to a data storage device. In addition, PCIe lanes for the network data transfer may be configured for maximum performance by enabling the PCIe lanes associated with the PCIe root port used for the transfer. This may allow maximum bandwidth and a maximum payload size.

System optimizer 275 may also be configured to perform system power management via selective control or manipulation of PCIe lanes and/or PCIe speed. In particular, system optimizer 275 may configure PCIe lanes at various operating system performance levels or USTT modes. For example, the operating system performance schemes and/or USTT modes may be mapped to PCIe performance settings which may be used to dynamically or adaptively control PCIe performance. For example, if information handling system 200 is in a USTT quiet mode, system optimizer 275 can lower the overall system power by adjusting a set of PCIe performance settings. For example, system optimizer 275 may reduce the number of PCIe lanes, reduce the PCIe speed, and other PCIe performance settings that lower the PCIe performance while providing power consumption savings. Conversely, if information handling system 200 is in a USTT performance mode, the PCIe performance settings can be configured for maximum performance. System optimizer 275 may use a mapping of operating system performance or USTT mode to PCIe performance settings, such as a table 500 of FIG. 5 to dynamically manage and control the PCIe performance.

Those of ordinary skill in the art will appreciate that the configuration, hardware, and/or software components of information handling system 200 depicted in FIG. 2 may vary. For example, the illustrative components within information handling system 200 are not intended to be exhaustive but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In the discussion of the figures, reference may also be made to components illustrated in other figures for continuity of the description.

Figure 3:
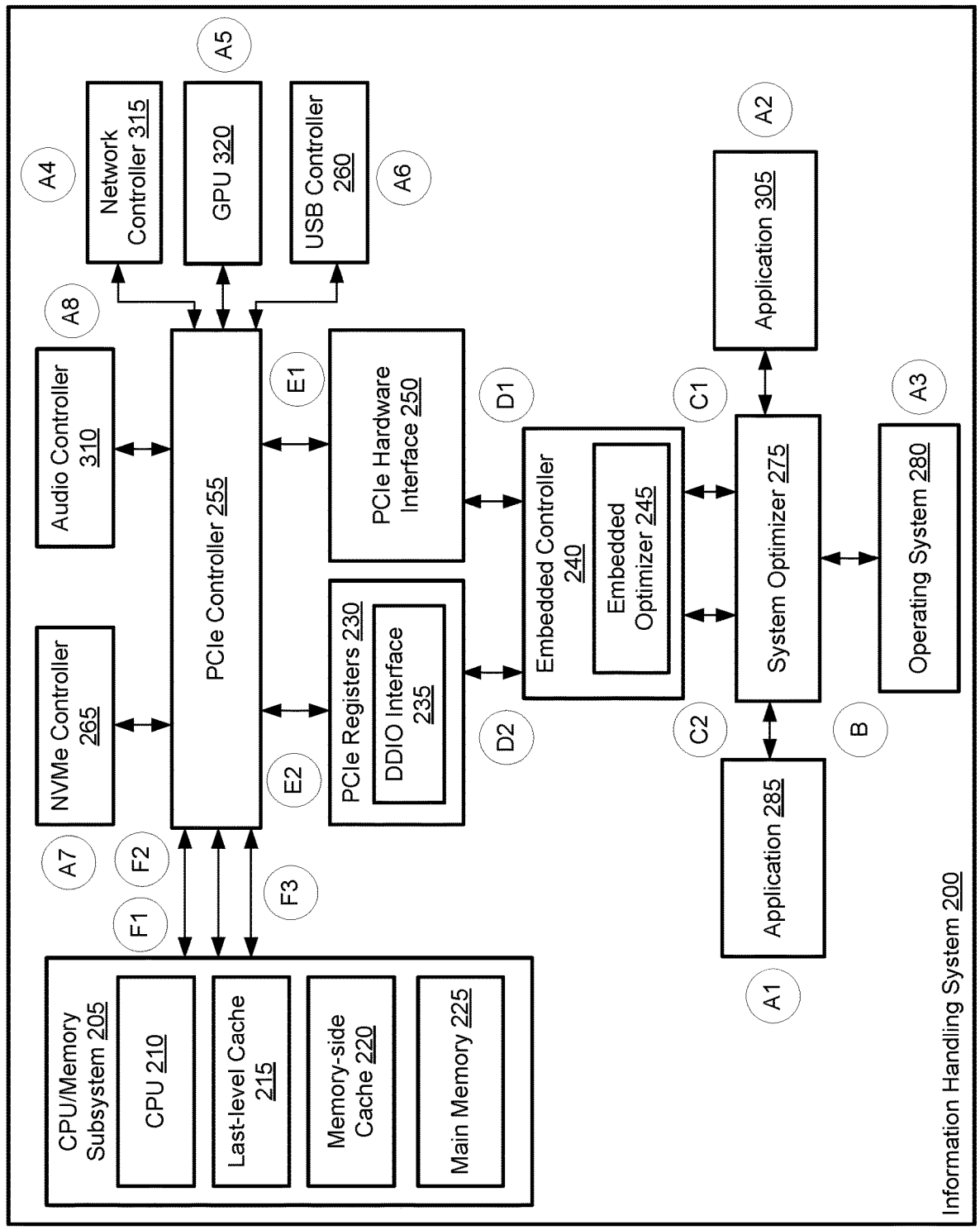

FIG. 3 shows a portion of information handling system, according to an embodiment of the present disclosure. FIG. 3 is annotated with a series of letters A1 through F3. Each of these letters represents a stage of one or more operations. Although these stages are ordered for this example, the stages illustrate one example to aid in understanding this disclosure and should not be used to limit the claims. Subject matter falling within the scope of the claims can vary with respect to the order of the operations.

At stage A1, system optimizer 275 may detect isochronous data transfer from or to application 285. Application 285 may store or retrieve audio recording data from a storage device in information handling system 200. For example, application 285 may be a digital audio workstation (DAW) used to record, edit, and produce music. At stage A2, system optimizer 275 may detect an asynchronous data transfer to or from application 305. Application 305 may be a file hosting service, such as OneDrive™. At stage A3, operating system 280 may provide information associated with a current power scheme of information handling system 200. Operating system 280 may implement a number of finite pre-defined power schemes, such as high-performance power scheme, and battery saver power scheme, among others.

At stage A4, system optimizer 275 may detect an I/O data transmission from or to a network controller 315 via PCIe controller 255. For example, the I/O data may be from a cloud service. The I/O data transmission may include asynchronous data, synchronous data, and isochronous data. The I/O data transmission may also be a mix of the aforementioned data. At stage A5, system optimizer 275 may detect an I/O data transmission from or to a GPU 320 via PCIe controller 255. The I/O data transmission may include isochronous data, such as image data for processing. At stage A6, system optimizer 275 may detect an I/O data transfer from or to a USB controller 260 via PCIe controller 255. The I/O data transfer may include isochronous data, such as audio and video data.

At A7, system optimizer 275 may detect an I/O data transfer from or to NVMe controller 265. For example, data may be read or stored in an NVMe data storage device. The I/O data transfer may include asynchronous data, synchronous data, and isochronous data. The I/O data transfer may also be a mix of the aforementioned data. At stage A8, system optimizer 275 may detect an I/O data transmission from or to an audio controller 310 via PCIe controller 255. The I/O data transmission may include isochronous data, such as audio data for processing. The stages A1, A2, A3, A4, A5, A6, A7, and A8 may be performed independently of each other, at different times. In other instances, two or more of these stages may be performed simultaneously. For example, isochronous data transfer from or to application 285 may be detected by system optimizer 275 while simultaneously receiving information associated with the current operating system power scheme. One of skill in the art will appreciate that the present disclosure is not limited to the examples provided.

At stage B, system optimizer 275 may determine a target DDIO capability of a PCIe port and PCIe performance setting, also referred to as a PCIe performance knob, to be adjusted or modified based on a set of criteria. The set of criteria may include application requirements and the type of I/O data detected. The determination may be based on a PCIe performance policy, such as depicted in table 500 of FIG. 5. For example, if system optimizer 275 detected an audio recording from application 285, then system optimizer 275 may determine to set ports at an intermediate performance setting.

At stage C1, system optimizer 275 may transmit information associated with the target DDIO capability and the PCIe performance setting to embedded optimizer 245. At stage C2, system optimizer 275 may transmit a power management trigger based on the current power scheme of information handling system 200. For example, system optimizer 275 may transmit a trigger to change the current USTT mode or the current power scheme of information handling system 200. In particular, system optimizer 275 may trigger an increase in cooling fan speed in response to an increase in temperature of information handling system 200 due to increased power consumption with processing the I/O data.

At stage D1, embedded optimizer 245 may change one or more of the PCIe performance settings via PCIe hardware interface 250, wherein the change can be based on the information received from system optimizer 275. The change may also be based on a set of criteria that includes workload type, user priority, data source, operating system power schema, USTT mode, I/O data type, and data source, among others. The PCIe performance settings include a maximum payload size, maximum read request size, read completion boundary size, PCIe speed, PCIe lane width, etc. For example, embedded optimizer 245 may change the PCIe lane width from eight lanes to sixteen lanes. At stage D2, embedded optimizer 245 may be configured to control a global DDIO capability of PCIe ports of the information handling system based on the set of criteria via DDIO interface 235. Similarly, embedded optimizer 245 may also be configured to control an individual DDIO capability of a PCIe port.

At stage E1, PCIe hardware interface 250 may change or update one or more PCIe performance settings as directed by embedded optimizer 245. The PCIe performance setting may be a global PCIe setting, a PCIe device setting, or a PCIe port setting. At stage E2, DDIO interface 235 may be used to enable or disable a DDIO capability of one or more PCIe root ports as directed by embedded optimizer 245. At stage F1, the asynchronous and/or synchronous data may be transferred to last-level cache 215 via a DMA transfer through an associated PCIe root port with enabled DDIO capability. At stage F2, some select isochronous data may be transferred to memory-side cache 220 via DMA through an associated PCIe root port with enabled DDIO capability. For example, the isochronous data from an IPU or USB controller 260 among others may be transferred to memory-side cache 220. At stage F3, some select isochronous data, such as from audio controller 310, may be transferred to memory-side cache 220 via DMA through an associated PCIe root port with an enabled DDIO capability.

Figure 4:
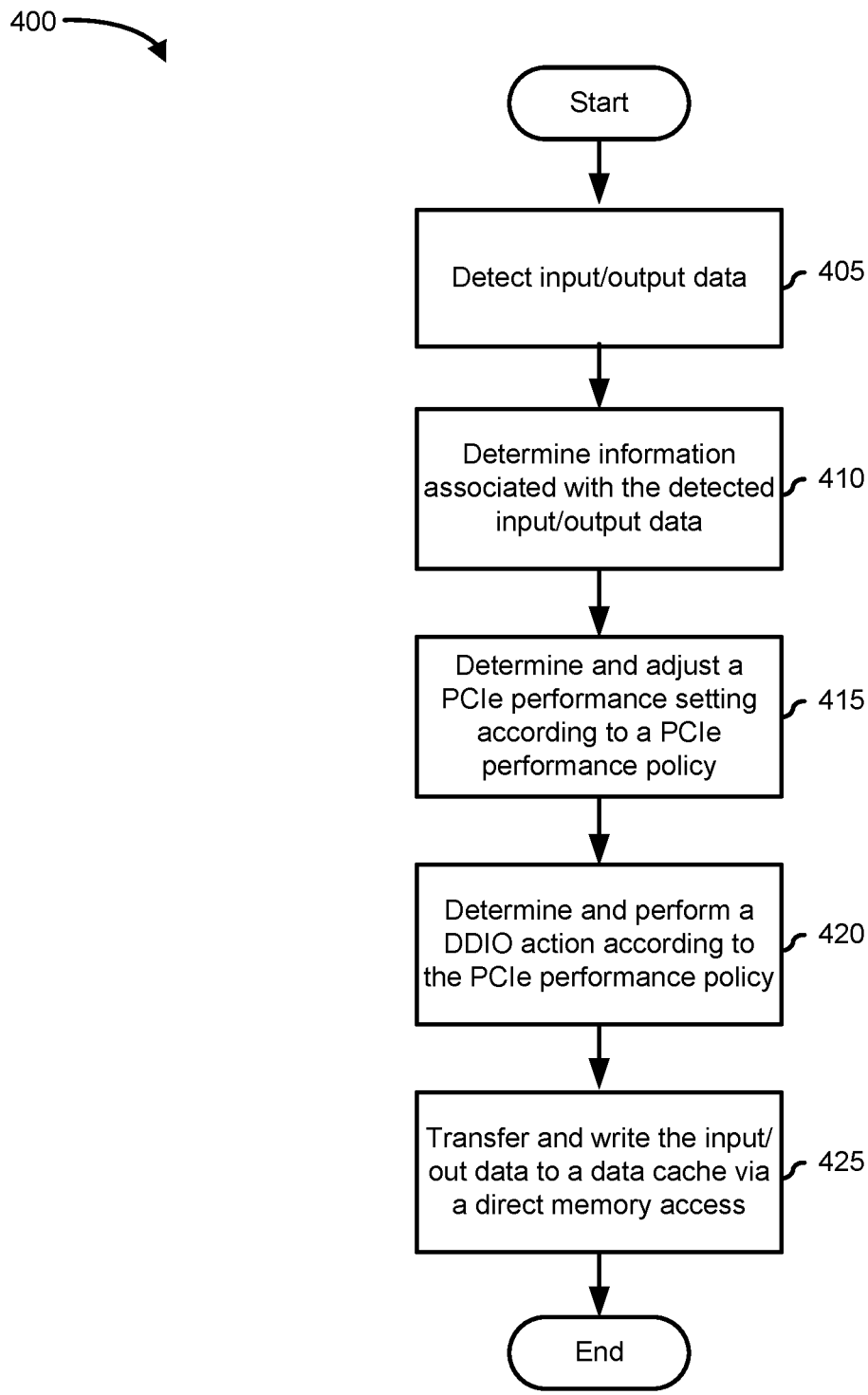
FIG. 4 is a flowchart of a method for dynamic peripheral component interconnect-express (PCIe) performance management, according to an embodiment of the present disclosure.

FIG. 4 shows a flowchart of a method 400 for dynamic PCIe performance management. Method 400 may be performed by any suitable component of information handling system 200 of FIG. 2 including, but not limited to, system optimizer 275 and embedded optimizer 245. While embodiments of the present disclosure are described in terms of the components of information handling system 200, it should be recognized that other components may be utilized to perform the described method.

Method 400 typically starts at block 405 where a system optimizer, while monitoring an information handling system, detects I/O data from or to the information handling system via one or more PCIe devices or components. The method proceeds to block 410, where the system optimizer may determine information associated with the I/O data, such as application type, usage, and data type. The method proceeds to block 415 where the system optimizer may determine one or more PCIe performance settings to be adjusted or modified based on the determined information and a PCIe performance policy. The system optimizer may transmit the adjustment or modification of one or more PCIe performance settings to an embedded optimizer. The embedded optimizer may adjust or modify one or more PCIe performance settings via a PCIe hardware interface. The adjustment or modification may be performed by programming one or more chipset registers associated with a PCIe configuration setting.

The method proceeds to block 420 where the system optimizer may determine one or more DDIO actions based on the determined information and the PCIe performance policy. The system optimizer may transmit information associated with one or more DDIO actions to the embedded optimizer. The embedded optimizer may apply one or more DDIO actions via a DDIO interface. For example, the embedded optimizer may enable or disable the DDIO capability of one or more PCIe ports of a PCIe controller. This may allow the transfer of the I/O data to a data cache. The method proceeds to block 425 where the I/O data may be transferred and written to the data cache via a DMA transfer based on which PCIe port was turned on or turned off.

FIG. 5 shows table 500 associated with a PCIe performance policy, according to an embodiment of the present disclosure. The PCIe performance policy includes a pre-defined mapping of a set of criteria that includes application type, usage, and data type to a DDIO action and PCIe performance setting. Table 500 includes one or more columns, such as an application type 505, a usage 510, a data type 515, a PCIe performance setting 520, and a DDIO action 525. One of skill in the art will appreciate that additional criteria than shown may be used in the mapping.

Application type 505 may include various software types, such as a DAW application, a file hosting service, a file archiver, a system optimizer, an operating system, a video conferencing application, among others. Usage 510 may indicate a current usage or workload type of an application type. Data type 515 may indicate the type of I/O data associated with the application type if any. PCIe performance setting 520 may indicate a PCIe performance setting, also referred to as a PCIe performance knob, to be adjusted or modified based on the application type, usage, and data type. DDIO action 525 may indicate a DDIO action to be performed based on the application type, usage, and data type. While there are five application types, various usages, and three data types included in table 500, one of ordinary skill in the art would recognize that table 500 may include any suitable number of application types, usages, and data types or combination thereof without varying from the scope of this disclosure.

Although FIG. 4 shows example blocks of method 400 in some implementations, method 400 may include additional blocks, fewer blocks, different blocks, or differently arranged blocks than those depicted in FIG. 4. Those skilled in the art will understand that the principles presented herein may be implemented in any suitably arranged processing system. Additionally, or alternatively, two or more of the blocks of method 400 may be performed in parallel. For example, block 415 and block 420 of method 400 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes, or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
    detecting, by a processor of an information handling system, transmission of input/output data;
    enabling a data direct input/output capability associated with a peripheral component interconnect-express (PCIe) port based on a type of the input/output data and an application type;
    performing a direct memory access transfer of the input/output data to a cache based on the type of the input/output data and the application type, wherein the direct memory access transfer of the input/output data is through the PCIe port with the data direct input/output capability; and
    modifying a PCIe setting based on the type of the input/output data and the application type associated with the input/output data, wherein the modifying of the PCIe setting is performed by programming a chipset register associated with a PCIe configuration setting, and wherein the modifying of the PCIe setting includes if the input/output data is an audio recording, then turn off a PCIe lane of an inactive PCIe port.

2. The method of claim 1, further comprising indexing the input/output data.

3. The method of claim 1, further comprising scanning the input/output data.

4. The method of claim 1, further comprising mapping of operating system performance to PCIe performance settings.

5. The method of claim 1, wherein if the input/output data is isochronous, then the input/output data is transferred to a memory-side cache.

6. The method of claim 1, wherein if the input/output data is asynchronous, then the input/output data is transferred to a last-level cache.

7. The method of claim 1, wherein if the input/output data is synchronous, then the input/output data is transferred to a last-level cache.

8. The method of claim 1, further comprising modifying a user-selectable thermal table mode.

9. An information handling system, comprising:
 a memory to store a peripheral component interconnect-express (PCIe) performance policy; and
 a processor to communicate with the memory, the processor to:
  detect transmission of input/output data;
  enable a data direct input/output capability associated with a PCIe port based on the PCIe performance policy; and
  perform a direct memory access transfer of the input/output data to a cache based on the PCIe performance policy, wherein the input/output data is transferred through the PCIe port with the data direct input/output capability, wherein if the input/output data is isochronous, then the input/output data is transferred to a memory-side cache.

10. The information handling system of claim 9, wherein the processor is further configured to modify a PCIe setting based on a type of the input/output data and application type associated with the input/output data.

11. The information handling system of claim 10, wherein the processor is configured to modify the PCIe setting by programming a chipset register associated with a PCIe configuration setting.

12. The information handling system of claim 10, wherein to modify the PCIe setting includes if the input/output data is an audio recording, then turn off a PCIe lane of an inactive PCIe port.

13. The information handling system of claim 9, wherein if the input/output data is asynchronous, then the input/output data is transferred to a last-level cache.

14. The information handling system of claim 9, wherein if the input/output data is synchronous, then the input/output data is transferred to a last-level cache.

15. A non-transitory computer-readable medium to store instructions that are executable to perform operations comprising:
 detecting transmission of input/output data;
 enabling a data direct input/output capability associated with a peripheral component interconnect-express (PCIe) port based on a type of the input/output data and an application type; and
 performing a direct memory access transfer of the input/output data to a cache based on the type of the input/output data and the application type, wherein the input/output data is transferred through the PCIe port with the data direct input/output capability, wherein if the input/output data is isochronous, then the input/output data is transferred to a memory-side cache.

16. The non-transitory computer-readable medium of claim 15, wherein the operations further comprise modifying a PCIe setting based on the type of the input/output data and the application type associated with the input/output data.

17. The non-transitory computer-readable medium of claim 16, wherein the modifying of the PCIe setting is performed by programming a chipset register associated with a PCIe configuration setting.

18. The non-transitory computer-readable medium of claim 16, wherein the modifying of the PCIe setting includes if the input/output data is an audio recording, then turn off a PCIe lane of an inactive PCIe port.

19. The non-transitory computer-readable medium of claim 15, wherein if the input/output data is asynchronous, then the input/output data is transferred to a last-level cache.

20. The non-transitory computer-readable medium of claim 15, wherein if the input/output data is synchronous, then the input/output data is transferred to a last-level cache.

* * * * *